(12) United States Patent
Hayward

(10) Patent No.: US 6,217,800 B1
(45) Date of Patent: *Apr. 17, 2001

(54) GRAPHITE FOAM MATERIAL AND METHOD OF MAKING SAME

(75) Inventor: Tommie P. Hayward, Saugus, CA (US)

(73) Assignee: SGL Technic, Inc., Valencia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/270,900

(22) Filed: Mar. 15, 1999

Related U.S. Application Data

(63) Continuation-in-part of application No. 08/724,177, filed on Sep. 30, 1996, now Pat. No. 5,882,570, which is a continuation-in-part of application No. 08/591,363, filed on Jan. 25, 1996, now Pat. No. 5,582,781.

(51) Int. Cl.[7] .................................................. C01B 31/04
(52) U.S. Cl. .................. 264/29.1; 264/29.5; 264/109; 264/28; 264/328.14; 264/328.18; 423/448
(58) Field of Search .................................. 264/29.1, 109, 264/29.7, 29.5, 28; 423/448

(56) References Cited

U.S. PATENT DOCUMENTS

| | | | |
|---|---|---|---|
| 5,130,199 | * | 7/1992 | Howard ................................ 428/408 |
| 5,500,471 | * | 3/1996 | Uota et al. ............................ 524/262 |
| 5,582,781 | * | 12/1996 | Hayward ............................. 264/29.5 |
| 5,605,755 | * | 2/1997 | Patil et al. ........................... 264/29.2 |
| 5,776,372 | * | 7/1998 | Saito et al. ........................... 252/511 |
| 5,882,510 | * | 3/1999 | Hayward ............................. 264/29.1 |
| 6,024,900 | * | 2/2000 | Saito et al. ........................... 264/29.6 |

OTHER PUBLICATIONS

Abstract of JP 356063811 May 1981.*

* cited by examiner

*Primary Examiner*—James Derrington
(74) *Attorney, Agent, or Firm*—Blakely, Sokoloff, Taylor & Zafman LLP

(57) ABSTRACT

Methods of making a graphite material are provided. A flexible graphite is ground into a powder. The graphite powder is mixed with a resin and the mixture is hot pressed. A second method of making a graphite material is provided where the graphite is ground into a powder; the graphite powder is soaked in a cryogenic liquid; the soaked graphite powder is then expanded; the expanded soaked graphite powder is mixed with a graphite powder; and the graphite powder mixed with a resin are hot pressed. According to a third method, the flexible graphite is ground into a powder; the graphite powder is soaked into a cryogenic liquid, the soaked graphite powder is expanded; and the expanded soaked graphic powder is ground into a fine powder. The resulting graphite powder is mixed with a resin. The graphite powder mixed with the resin is hot pressed. According to a fourth method, graphite flakes are soaked into an acid; the soaked graphite flakes are expanded; and the expanded soaked graphite flakes are precompacted. The precompacted soaked graphite flakes are ground into a powder. The ground precompacted expanded soaked graphite powder is then mixed with a resin. The graphite powder with the resin is hot pressed.

18 Claims, 9 Drawing Sheets

GRAPHITE FOAM MATERIAL AND METHOD OF MAKING SAME

This is a continuation-in-part of U.S. patent application Ser. No. 08/724,177 filed Sep. 30, 1996, now U.S. Pat. No. 5,882,570, which is a continuation-in-part of U.S. patent application Ser. No. 08/591,363 filed Jan. 25, 1996, now U.S. Pat. No. 5,582,781.

BACKGROUND OF THE INVENTION

1. Field of the Invention

The invention relates to graphite foam material, of the type used for high temperature insulation and the like, and to a method of making the same. The invention also relates to a graphite material that may be used and added to provide protection from electrostatic discharge (ESD) or shielding from electromagnetic and radio interference (EMI/RFI).

2. Art Background

In the prior art, various forms of graphite material have been used as insulating materials in high temperature applications including industrial ovens and furnaces, vacuum furnaces and controlled atmosphere heating apparatus and the like.

One of the first such graphite insulating materials was powdered carbon black which had an appropriate amount of insulating capacity, but was very difficult to handle, relatively heavy, and extremely time consuming to replace. As a result with the advent of foam and resin chemistry, a number of newer materials were developed which were lighter and easier to handle, but which had the requisite insulating capacity. One such material is a carbon fiber insulating material made of a carbon fiber held in a matrix by a phenolic resin material, and formed into a board or block.

Static electricity and electrostatic discharge (ESD) are naturally occurring phenomena. Simply stated, static electricity is electrical energy at rest on a surface. It is generally created by the rubbing together and separating of two materials, one of which is usually non-conductive. Typically, one material gives up electrons and becomes positively charged; the other takes on the electrons and becomes negatively charged. ESD may be defined as the sudden discharge of an electrostatic potential from one body to another. A good example may be the shock one receives when touching a metal door knob after walking across a carpeted floor.

In many environments, ESD may damage or destroy sensitive electronic components, erase or alter magnetic media, or set off explosions or fires in flammable environments. These discharges may be caused by a variety of sources, most commonly there is a direct discharge from a person or equipment into a sensitive object.

One way of preventing ESD is to reduce the generation of charges in the first place. A second way of preventing ESD is to provide a ground path for the safe dissipation of accumulated charges to ground. A third method is to provide shielding or protection of devices and equipment from discharge through packaging. ESD may also be controlled with materials, such as conductive plastics, that do not generate high levels of charge, that dissipate charges before they accumulate to dangerous levels, or that provide electrostatic shielding to prevent charges from reaching the sensitive product.

Electromagnetic Interference (EMI) is electrical energy, either electromagnetic or in the radio frequency (RF) range in the case of radio frequency interference (RFI) that is radiated by specific sources. Some of these sources include computer circuits, radio transmitters, fluorescent lamps, color TV oscillators, electric motors, automotive ignition coils, overhead power lines, lightning, TV games, and many other resources. EMI/RFI may interfere with the operation of simple household appliances such as causing the unwanted operation of garage door openers. On another level, EMI/RFI may corrupt data in large scale computer systems, cause inaccurate readings and output in aircraft guidance systems, and interrupt the functioning of medical devices, such as pacemakers.

Proper shielding may prevent products from emitting electromagnetic or radio frequency energy to other susceptible equipment. Shielding may also protect susceptible equipment from the effects of externally radiated EMI/RFI as the shielding absorbs the energy emitted, converting it to thermal energy.

EMI thermoplastic composites are used primarily for shielding against emission or reception of EMI and RFI. Traditionally, shielding has been accomplished by encasing sensitive electronic parts in metal housings or by using metallic coatings on the inside of plastic housings. Thermoplastic compounds with appropriate shielding additives are cost effective alternatives in many applications due to their ability to take on complex shapes and maintain tight tolerances.

It is desirable to provide, at relatively low cost, a compound/s that may dissipate charges before they accumulate to dangerous levels, that provide electrostatic shielding to prevent charges from reaching the sensitive product. Moreover, it is desirable to provide, at relatively low cost, a material for shielding against emission or re-emission of electrostatic.

SUMMARY OF THE INVENTION

The present invention is a composition of matter, and specifically, a material comprising cryogenically treated graphite or carbon particles which are then expanded by thermal shock/gas expansion. The expanded particles are then combined with a phenolic resin, or the like, and then thermoset under pressure at an elevated temperature to form a hardened sheet or plate. The carbon or graphite particles can be obtained from previously expanded graphite which has been made into flexible graphite foil, and therefore, the present invention permits the recycling of graphite foil which is not otherwise commercially distributed. The method of making said material is also described and claimed.

The material has generally the same insulating and other physical characteristic as the prior art carbon fiber insulation materials, and it is less expensive than prior art materials.

Another advantage of the present invention is that it can utilize, without any drawbacks, recycled flexible graphite material, as a starting material. Such recycled flexible graphite material is currently typically being landfilled. Thus, the present invention is particularly advantageous as a benefit to the environment. Additionally, the advantageous method of making the material and the quality of the material made in accordance with the present invention provide additional benefits.

Another advantage is the reduced weight loss due to oxidation, resulting in longer furnace life between successive rebuilding of the furnace.

According to the present invention, one may use finished low density blocks, boards, billets, etc. to make higher density parts by cutting (i.e., using, for example, a cork bore or saw) to shape or mold the material into a desired shape and pressing using different pressures to obtain the desired density. For example, die formed rings can be made using the present invention. The compressive strength of the die formed rings was greater than or equal to the strength of some monolithic graphites of the prior art.

The present invention also includes a graphite material and a method for making the graphite material by using a thermoplastic material mixed with re-expanded graphite. The compound of thermo plastic material and re-expanded graphite is fed into an injection molding system at a relatively high temperature and injected into a mold where a plastic material is formed. The plastic material is then removed from the mold when the material is still very hot but hard set.

The present invention further includes in one embodiment thereof a method of making a graphite material. Flexible graphite is ground into a powder having a particle size in the approximate range of 25 to 80 mesh. The graphite powder is mixed in an amount ranging between approximately 10%–90% graphite powder by weight, with a resin, in an amount ranging between approximately 10%–90% by weight. The graphite powder, mixed with the resin is hot pressed.

The present invention also provides in another embodiment thereof a method of making a graphite material. A flexible graphite is ground into a powder having a particle size in an approximate range of 25–80 mesh. The graphite powder is soaked in a cryogenic liquid. The soaked graphite powder is expanded. The resulting graphite powder is mixed in an amount ranging between approximately 10%–90% by weight with a resin, in an amount ranging between approximately 10%–90% by weight. The expanded soaked graphite powder that has been mixed with the resin is then hot pressed.

The present invention further provides in another embodiment thereof a method of making a graphite material. A flexible graphite is ground into a powder having a particle size in an approximate range of 25–80 mesh. The graphite powder is then soaked in a cryogenic liquid. The soaked graphite powder is then expanded. The expanded soaked graphite powder is ground into a powder having a particle size in an approximate range of 48 to 100 mesh. The resulting graphite powder is mixed, in an amount ranging between approximately 10%–90% by weight with a resin in an amount ranging between approximately 10%–90% by weight. The graphite powder mixed with the resin is then hot pressed.

The present invention provides in another embodiment thereof a method of making a graphite material. Initially, graphite flakes are soaked in an acid. The soaked graphite flakes are then expanded. The soaked expanded graphite flakes are precompacted. The precompacted expanded soaked graphite is then ground into a powder that has a particle size in a range of approximately 25 to 80 mesh. The graphite powder is mixed in an amount ranging between approximately 10%–90% by weight with a resin in an amount ranging between approximately 10%–90% by weight. The graphite powder that has been mixed with the resin is then hot pressed.

BRIEF DESCRIPTION OF THE DRAWINGS

The objects, features and advantages of the present invention will become apparent to one skilled in the art from reading the following detailed description in which.

DETAILED DESCRIPTION OF THE INVENTION

In the following description, numerous specific details re set forth to provide a thorough understanding of the resent invention. However, one having ordinary skill in the art should recognize that the invention may be practiced without these specific details. In some instances, well-known circuits, structures, and techniques have not been shown in detail to avoid obscuring the present invention.

Figure 1:
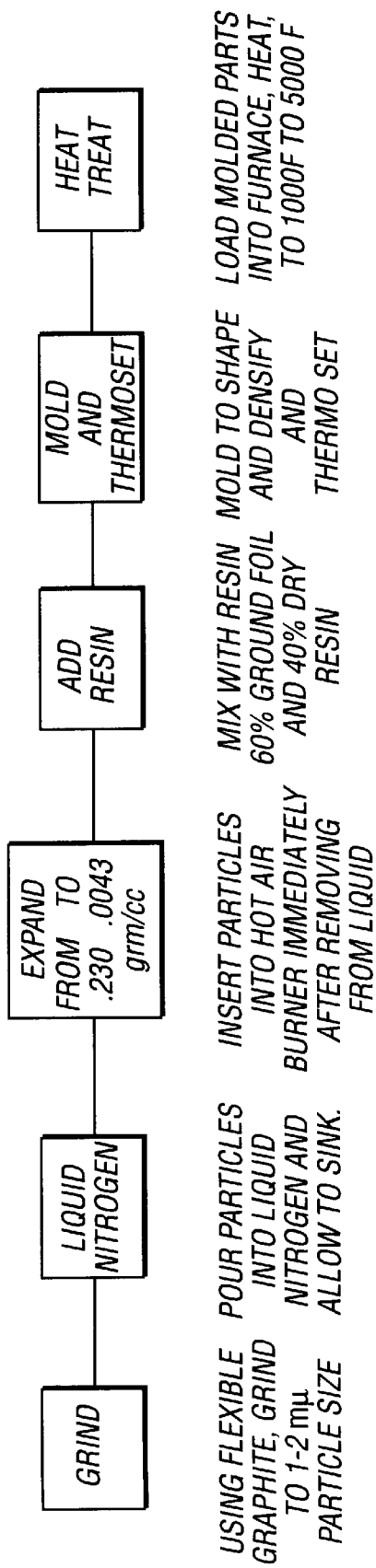
FIG. 1 is a flow chart showing on embodiment of process of the present invention.

The present invention relates to a material and methods of making materials, with different densities, the materials having superior heat insulation capacity for use in furnaces and other apparatus. The method of making the present invention is shown in the flow chart in FIG. 1.

The starting material is preferably recycled flexible graphite, such as the type which may be obtained as a byproduct from the manufacture of flexible graphite rolls.

The flexible graphite material is sometimes referred to as vermiculated graphite. It is a graphite material which has already been subjected to an expansion process, typically an acid treatment of graphite followed by a heat shock treatment. The starting material can be in the form of chunks, bricks, strips, or any other form which may be obtained.

The flexible graphite is first ground to a very fine powder having a particle size in the range of 35 to 80 mesh and a tap density of approximately 0.177–0.230 g/cc. Somewhat smaller or larger mesh ca n be used as well, but the particle size is preferably within the range of 35 to 80 mesh as specified. The flexible graphite can be ground in a cone mill grinder or hammer mill grinder or other grinder known in the art.

In the next step, the powdered carbon particles are poured into a container of liquid nitrogen, and permitted to absorb sufficient liquid nitrogen so that they sink in the container below the surface of the liquid nitrogen. It is believed that other cryogenic liquids may also work, and are deemed to be within the scope of the present invention. The sinking of the particles, while not deemed critical to the subject process, appears to be an adequate indicator of sufficient absorption of the liquid nitrogen into the particles, which is important in the following expansion step.

Alternatively, one may treat ground flexible graphite with acid such as fuming nitric acid, sulfuric acid, etc., and then heat the compound, of the respective acid and ground flexible graphite, thereby causing graphite to expand. For example, an experiment was conducted using 4 grams of ground flexible graphite and 6 centimeters cube (cc) of fuming nitric acid. The compound was then heated to 1100° Celsius (C). The expansion ratio obtained was 8 to 10 times.

Figure 2:
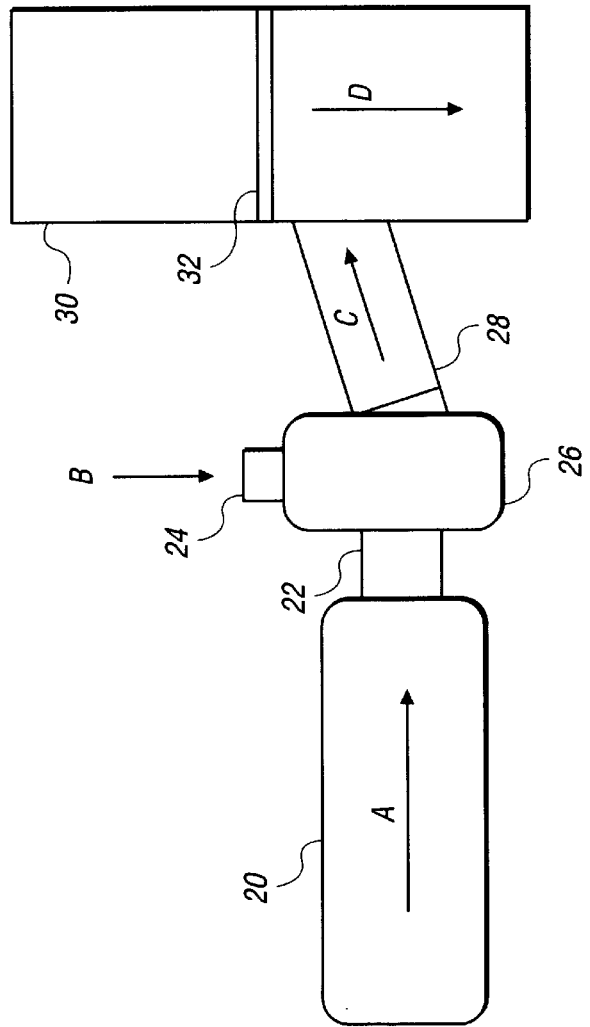
FIG. 2 is a schematic drawing of the heat shock apparatus used in one method of the present invention.

The liquid nitrogen soaked carbon particles or the ground flexible graphite particles treated with one of the above-mentioned acids are next injected into a hot air burner in an oven with an air stream flowing therethrough, the oven temperature being approximately 650° Fahrenheit (F). One such acceptable hot air burner is a propane burner such as a Universal® 40,000 BTU per hour propane heater. One possible arrangement is shown in FIG. 2. As shown the heat shock/gas expansion apparatus comprises a propane heater 20, with the heated air flow direction shown by arrow A, coupled through a conduit 22 to a receiving means 24 which receives the liquid nitrogen soaked particles through the top inlet 26 is (which are added in the direction shown by arrow B. The receiving means 24 is coupled through conduit 26 to heat treated particles receiving means 28, which has a screen 30 to prevent the particles, which are now very light, from becoming excessively airborne.

If the recycled graphite particles are used, this heat treatment or thermal shock/gas expansion expands the p articles to about 4 to 8 times their original size, and the density of the particles is in the range of 0.080 to 0.030 grams per cubic centimeter. The expanded particles may be compressed and molded to the de sired size, shape and density without using the next steps.

The expanded, thermally-shocked, carbon material is then mixed with a resin, and preferably a phenolic resin, and most preferably a phenolic resin such as Borden Durite RD-2414 in a preferred ratio of about 60% carbon to 40% resin by weight. Other ratios may be used, and the selection of a ratio is within the skill of persons of ordinary skill in the art.

The mixture is then thermoset at a temperature of 350° F. and a pressure dependent upon the density required for about 1 hour. The shape of the product can be any shape and size as required for the intended purpose.

The thermoset product is then heat treated in a furnace. The temperature of the heat treatment is preferably about 2000° F., but may vary from 1000–5000° F. depending upon final usage.

The density may be in the range from less than 0.1 g/cc to approximately theoretical density.

Figure 3:
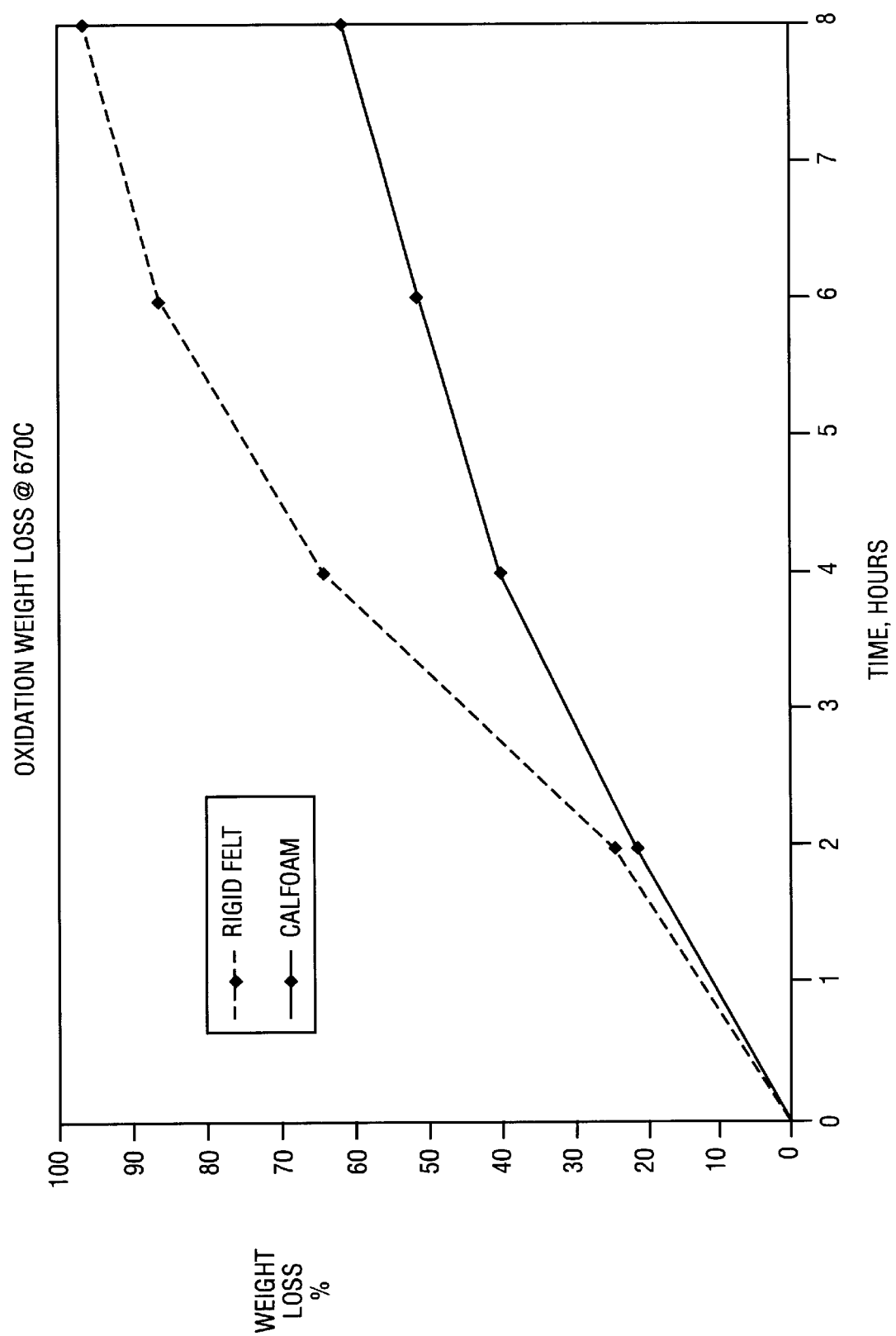
FIG. 3 is a graph showing the oxidation weight loss of prior art rigid felt as compared with the material of the present invention, which is the invented material at 670° C. over time.

FIG. 3 shows a comparison of prior art material to the material of the present invention, and particularly shows that there is substantially more weight loss from the prior art material being exposed to elevated temperature over time which is considered disadvantageous to those skilled in the art.

Figure 4:
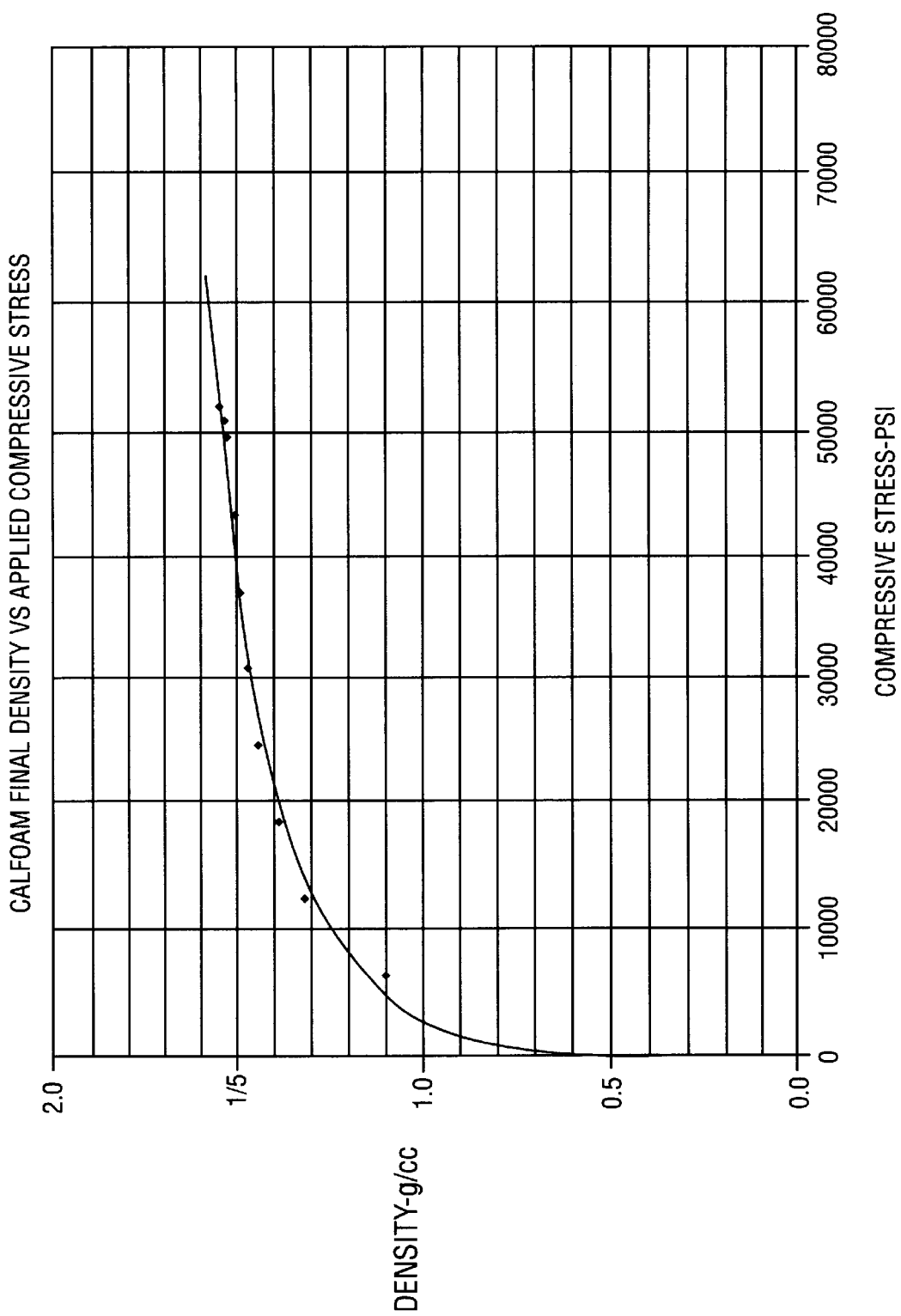
FIG. 4 is a graph showing the final density of the invented material as a result of the compressive force applied to it.

FIG. 4 illustrates the density of the material as a result of the pressure applied to it during its manufacture.

Figure 5:
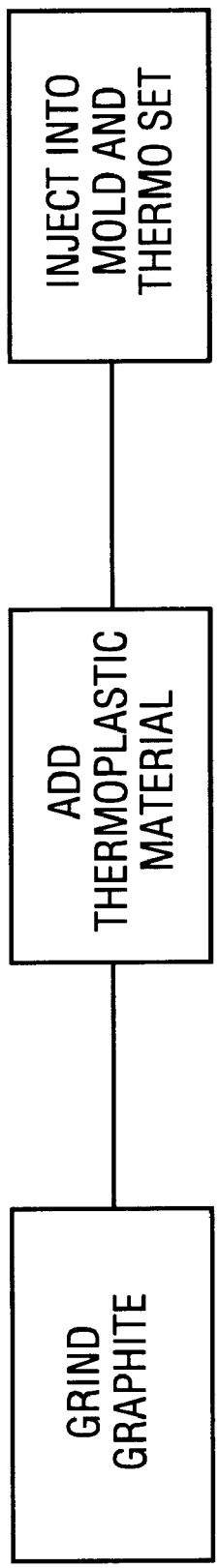
FIG. 5 is a graph showing steps of a second embodiment of a method according to the present invention.

In another embodiment of the present invention, a method for making a substantially high density graphite material with plastic characteristics (graphite-plastic) is provided. The main steps of this method are shown in FIG. 5. According to this method, a thermoplastic material, such Polyphelene Sulfide (PPS) may be mixed with re-expanded graphite thereby producing graphite pellets. The pellets may then be expanded by using the expansion process described in the foregoing. In this respect, the description of the expansion process presented in the foregoing is herein incorporated by reference. Note that while the expansion process is not necessary to the method described herein, this process is, however, preferable.

In the embodiment, of the method according to the present invention, described herein, the compound material, i.e., pellets, include a thermoplastic material mixed with 45–60% re-expanded graphite, but the present invention is not limited in scope in this respect. The compound material is then injected into a mold at a temperature of approximately 650° F. The mold may have an approximate dimension of 6"×9"× 0.125", but the present invention is not limited in scope in this respect. The injection of the compound may be performed for approximately 1 minute. Graphite material with plastic characteristics is then formed into plates, or other type of shapes in the mold at a temperature of 250° Fahrenheit and removed therefrom when the material is still hot, but hard set.

The resulting graphite material with plastic characteristics produced may be formed into different geometry's due to its high density of the produced which allows the graphite-plastic materials produced to be shaped better. The graphite-plastic plates obtained have a density of approximately 1.5 grams per cc. It is believed that any thermoplastic material may be used in this process instead of the PPS.

A graphite-plastic material according to the present invention may also be obtained by using a thermosetting plastic such as phenolic resin, epoxy resin, and mixing it with graphite powder. The compound of thermoset material and the graphite powder may then be heated to a temperature that is below the thermosetting temperature (350° F.) for approximately an hour and then introduced in a mold by using a process of hot pressing which is well-known by one skilled in the art. It will be noted that instead of graphite powder, re-expanded graphite may be used in this process.

The present invention also provides a method for making an electrically conductive plastic that has a relatively low resistivity. According to this process, a PPS material or a liquid crystal polymer (LCP) resin is mixed with re-expanded graphite to make pellets as explained above. The pellets are then mixed in a tumbler with 20% by weight nickel coated carbon fibers. The nickel coated carbon fibers may be a mixture of 50% carbon particles and 50% nickel in various concentrations. The addition of nickel coated carbon fibers to the pellets causes a decrease the bulk resistance of the pellets from approximately 0.100 ohm inches to 0.00085 ohm inches. Then this compound is subject to an injection molding process as explained in the foregoing. The material produced has both a low electrical resistivity and a high corrosion resistance. Moreover, the material produced may be used for bipolar plates in photon exchange membrane (PEM) type fuel cells, gaskets such as intake manifold, flange gaskets, etc. for automotive devices.

Figure 6:
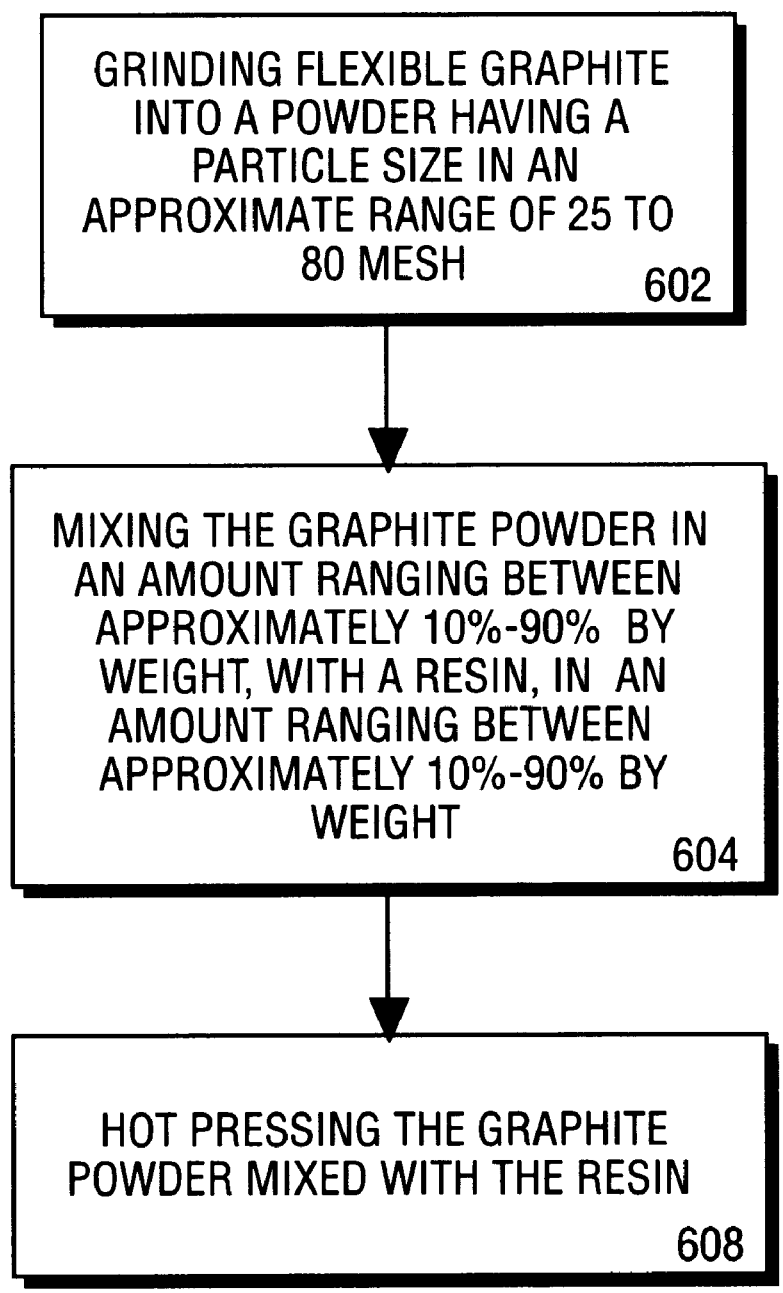
FIG. 6 is a flow chart diagram illustrating a third embodiment of a process of making a graphite material according to the present invention.

FIG. 6 illustrates a flow chart diagram for a third embodiment of a process of making a graphite material according to the present invention. The process starts at step 602 where flexible graphite is ground into a very fine powder having a particle size in an approximate range of 25–80 mesh and a tap density in a range of approximately 0.177–0.230 grams/ centimeter cube (g/cc). However, the present invention may be practiced in connection with other particle sizes and tap densities. The flexible graphite may be ground in a cone mill grinder or hammer mill grinder or other grinder known in the art. In one embodiment, the starting material may be recycled flexible graphite, of a type which may be obtained as a byproduct from the manufacture of flexible graphite rolls. The starting material may be in the form of chunks, bricks, strips, or any other form. The flexible graphite material is sometimes referred to as vermiculated graphite. Vermiculated graphite material is a material that has already been subjected to an expansion process where typically the graphite material is treated with an acid and then subjected to a heat shock treatment.

The process then flows to block 604 where the graphite powder obtained from grinding the flexible graphite is then mixed with a resin. In one embodiment according to the present invention, the resin includes a phenolic resin that may be Borden Durite RD 2414, but the present invention may be equally practiced in connection with other resins. The graphite powder is mixed in an amount ranging between approximately 10%–90% by weight with phenolic resin in an amount ranging between 10%–90% by weight such that the sum of the x% graphite and y% phenolic resin, of the combination, equals 100%. Table 1 shows possible mixture ratios between graphite and resin and the corresponding resistivities of the mixtures in microhms per meter square.

TABLE 1

| Graphite | Resin | Resistivity |
|---|---|---|
| 90% | 10% | 17.8 Microhms/meter square |
| 80% | 20% | 26.5 Microhms/meter square |
| 70% | 30% | 33.0 Microhms/meter square |
| 60% | 40% | 61.1 Microhms/meter square |
| 50% | 50% | 90.2 Microhms/meter square |
| 40% | 60% | 166.0 Microhms/meter square |
| 30% | 70% | 328.0 Microhms/meter square |
| 20% | 80% | 2294.0 Microhms/meter square |
| 10% | 90% | N/A |

Next, at block 608 the graphite powder mixed with the phenolic resin (mixture) is hot pressed. Before hot pressing, the combination of graphite powder with phenolic resin is introduced into a first mold. The mold may have an approximate dimension of 6"×9"×0.125", but the embodiment of the process described herein may be equally practiced in connection with molds having higher or lower dimensions. The mixture combination is introduced into the first mold by pouring graphite powder and the phenolic resin into the first mold. The mixture is hot-pressed at a pressure less than 1 pound per square inch (psi) at approximately 250° F. for approximately 30 minutes. As a result of subjecting the mixture to hot pressing, the particles of the graphite powder and the phenolic resin bind together at a density of approximately 0.1 g/cc. However, this density may be different than 0.1 g/cc. The mixture is then removed from the first mold and is placed into a second mold and hot-pressed at approximately 350° F. at 2000 psi, for approximately 30 minutes.

The resulting graphite material obtained by way of s the process described above has a density of approximately 1.5 g/cm³. As one may see from Table 1, the more graphite the mixture has, the resulting graphite material's resistivity is lower, reaching 17.8 microhm per meter square for 90% graphite and 10% resin.

Figure 7:
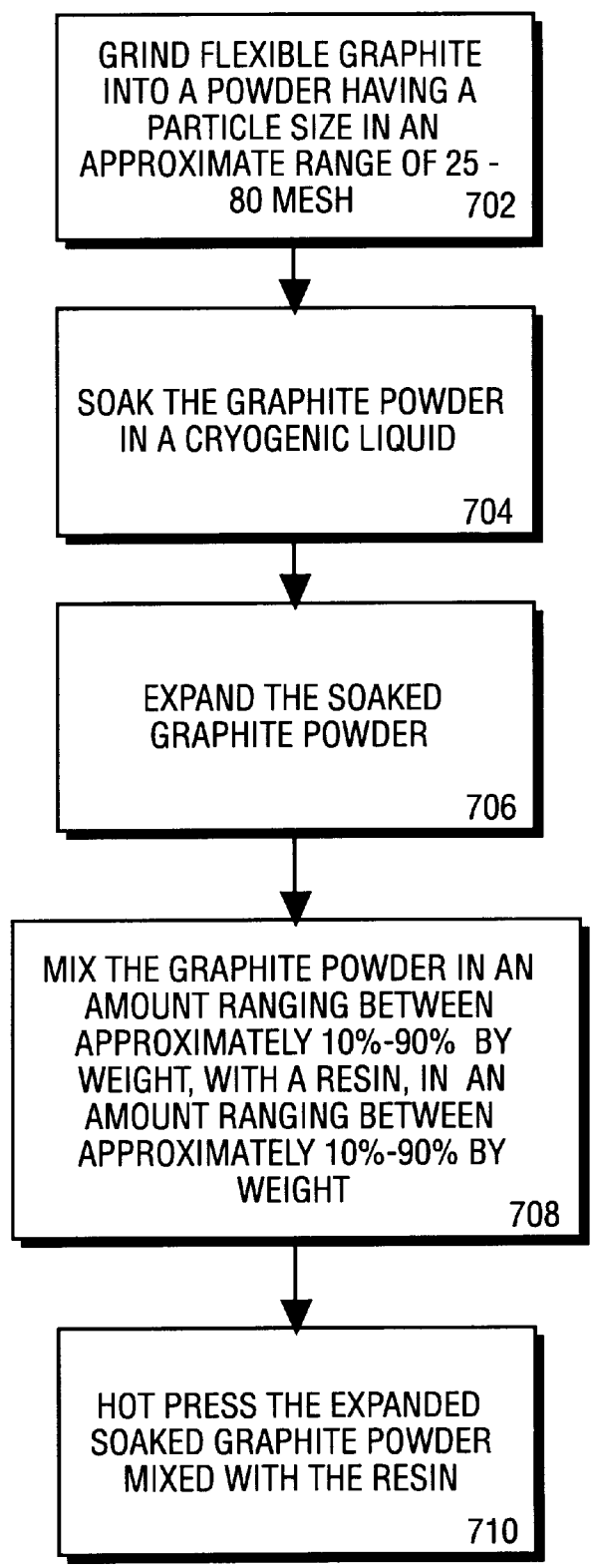
FIG. 7 is a flow chart diagram illustrating a fourth embodiment of a process of making a graphite material according to the present invention.

FIG. 7 illustrates a flow chart diagram in connection with a fourth embodiment of a process of making a graphite material according to the present invention. Initially, at block 702, flexible graphite is ground into a powder that has a particle size in a range of approximately 25 to 80 mesh. More details related to this process step were provided above in the description connected to the previous embodiment illustrated in FIG. 6. Next the process flows to step 704 where the graphite powder is soaked in a cryogenic liquid. More detail with respect to this step may be found above in the description connected to FIG. 1.

Next, at block 706 the soaked graphite is expanded. In one embodiment according to the present invention, the soaked graphite compound may be expanded by heating the soaked graphite compound to a temperature of approximately 650° F. One way to perform this expansion is by heating the soaked graphite as explained above in the description connected to FIGS. 1 and 2.

Next at step 708 the expanded graphite compound is mixed in an amount ranging between approximately 10%–90% by weight with phenolic resin in an amount ranging between 10%–90% by weight. Table 2 below illustrates possible mixtures of graphite with the resin and their respective resistivities.

TABLE 2

| Graphite | Resin | Resistivity |
|---|---|---|
| 90% | 10% | 10.0 Microhms/meter square |
| 80% | 20% | 17.0 Microhms/meter square |
| 70% | 30% | 33.0 Microhms/meter square |
| 60% | 40% | 38.7 Microhms/meter square |
| 50% | 50% | 60.9 Microhms/meter square |
| 40% | 60% | 84.5 Microhms/meter square |
| 30% | 70% | 134.0 Microhms/meter square |
| 20% | 80% | 248.0 Microhms/meter square |
| 10% | 90% | 736.0 Microhms/meter square |

Next the graphite mixture is hot pressed after initially introducing the graphite mixture into a first mold. Hot pressing is performed in a manner as explained above in the description in connection with the embodiment of the process illustrated in FIG. 6.

Figure 8:
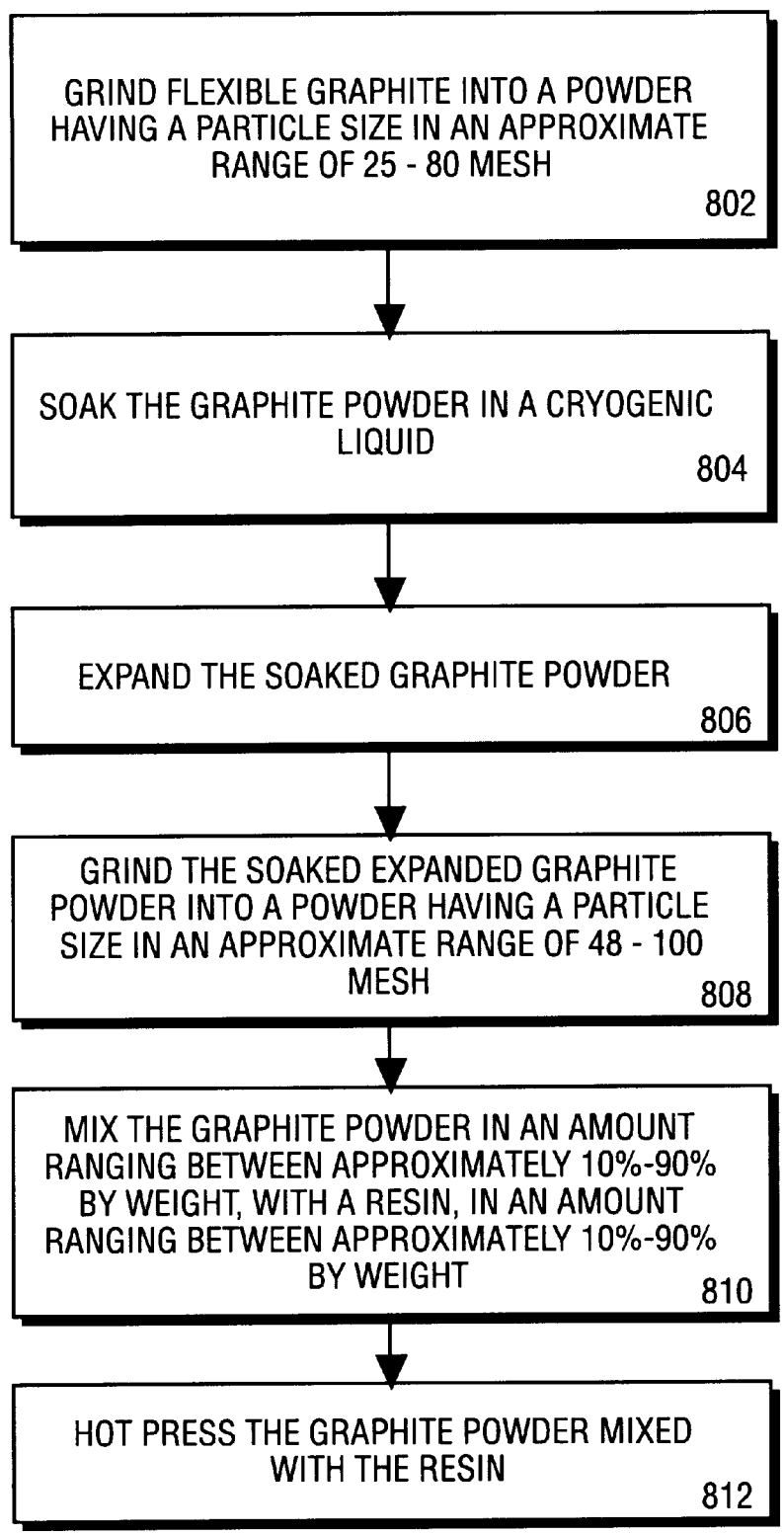
FIG. 8 is a flow chart diagram illustrating a fifth embodiment of a process of making a graphite material according to the present invention.

FIG. 8 illustrates a flow chart in connection with an embodiment of a fifth process of making a graphite material according to the present invention. The embodiment of this process starts at block 802 where flexible graphite is ground into a powder that has a particle size in a range of approximately 25–80 mesh. Next the process flows to block 804 where the graphite powder is soaked in a cryogenic liquid. The process then flows to block 806 where the soaked graphite powder is expanded by heating to a temperature at which the soaked graphite powder expands. In one embodiment this temperature is approximately 650° F., but the present invention equally applies in connection with heating at other temperatures that cause expansion of the soaked graphite flakes. Next at block 808, the expanded graphite powder is ground into a finer graphite powder that has a particle size in a range of approximately 48–100 mesh but the present invention is not limited in scope to this particle size range. At block 810, the finer graphite powder is mixed in an amount ranging between approximately 10%–90% graphite powder by weight with phenolic resin in amount ranging between 10%–90% by weight. Next at block 812, the graphite mixture is hot pressed as explained above in the description of the embodiments of the processes illustrated in FIGS. 6 and 7.

Table 3 illustrates possible mixture ratios between graphite and resin and the corresponding resistivities of the resulting graphite materials.

TABLE 3

| Graphite | Resin | Resistivity |
|---|---|---|
| 90% | 10% | 15.0 Microhms/meter square |
| 80% | 20% | 23.6 Microhms/meter square |
| 70% | 30% | 25.8 Microhms/meter square |
| 60% | 40% | 46.1 Microhms/meter square |
| 50% | 50% | 116.9 Microhms/meter square |
| 40% | 60% | 161.8 Microhms/meter square |
| 30% | 70% | 186.8 Microhms/meter square |
| 20% | 80% | 1219.9 Microhms/meter square |
| 10% | 90% | N/A |

Figure 9:
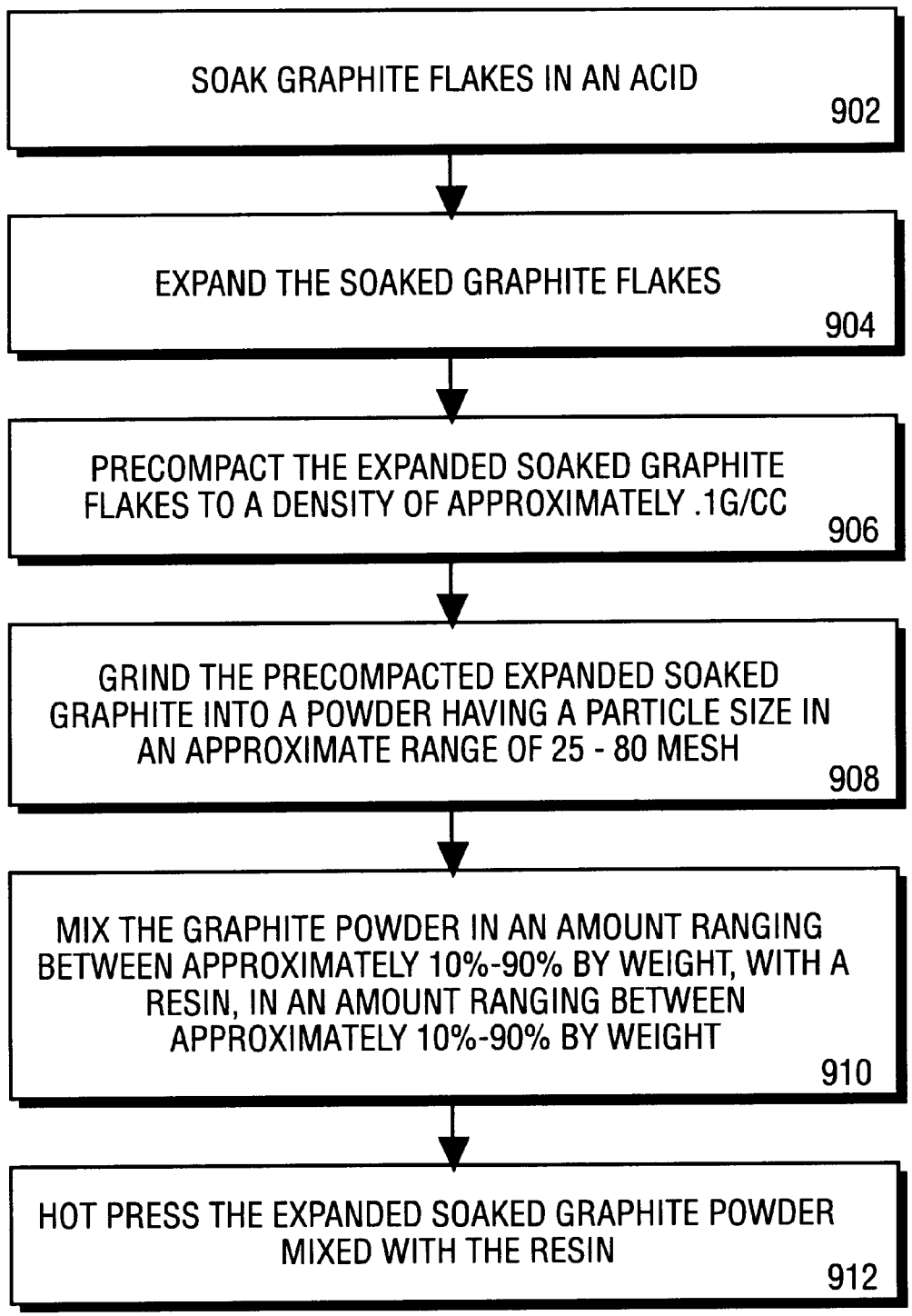
FIG. 9 is a flow chart diagram illustrating a sixth embodiment of a process of making a graphite material according to the present invention.

FIG. 9 illustrates a sixth embodiment of a process of making a graphite material according to the present invention. At block 902 natural graphite flakes are soaked in an acid. In one embodiment the acid may be nitric acid or sulfuric acid. Next the process flows to block 904 where the soaked natural graphite flakes are expanded. The expansion is performed by heating the soaked natural graphite flakes at a temperature of approximately 1200° F. to expand in a range of 200–400 times depending on the graphite. Next, at block 906, the expanded soaked natural graphite flakes are precompacted to a density of approximately 0.1 g/cm³. Next, at step 908 the expanded precompacted soaked natural graphite flakes are ground to a particle size in an approximate range of 25–80 mesh. At block 910, the graphite powder is mixed in a ratio ranging between approximately 10%–90% graphite powder by weight with a phenolic resin in an amount ranging between 10%–90% by weight. Next at block 912, the mixture is hot pressed. The steps performed during the hot press stage are similar to the steps described above in connection with hot pressing.

Table 4 illustrates possible combination ratios between graphite and resin, and the corresponding resistivity of the resulting graphite materials.

TABLE 4

| Graphite | Resin | Resistivity |
|---|---|---|
| 90% | 10% | 18.05 Microhms/meter square |
| 80% | 20% | 21.3 Microhms/meter square |
| 70% | 30% | 32.2 Microhms/meter square |
| 60% | 40% | 73.0 Microhms/meter square |
| 50% | 50% | 83.0 Microhms/meter square |
| 40% | 60% | 119.0 Microhms/meter square |
| 30% | 70% | 4136.0 Microhms/meter square |
| 20% | 80% | N/A |
| 10% | 90% | N/A |

Figure 10:
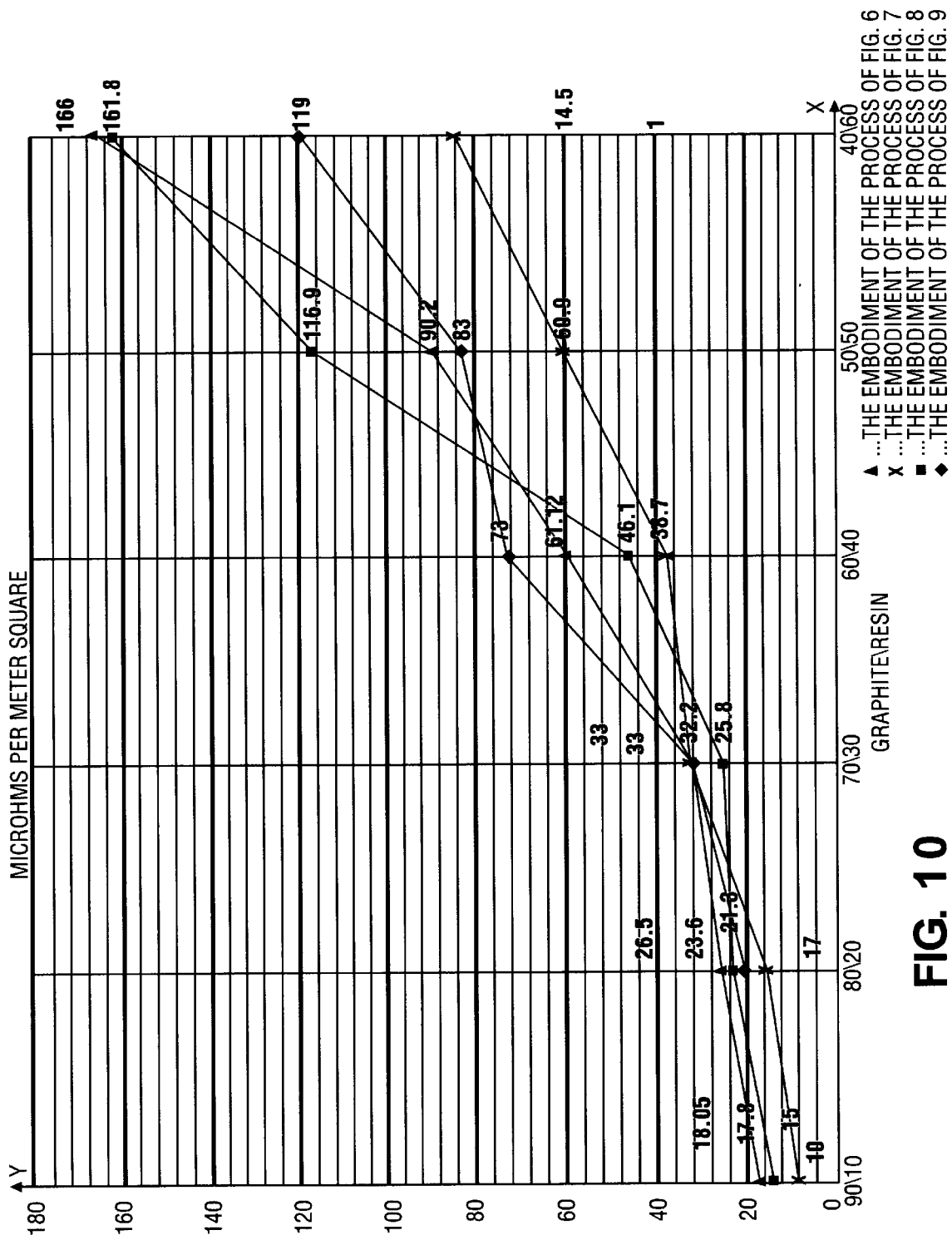
FIG. 10 illustrates a graph in connection with the resistivity per meter square of the graphite material produced by way of the third, fourth, fifth and sixth embodiments of the method of making a graphite material according to the present invention.

FIG. 10 illustrates four graphs in connection with the resistivity of the graphite materials obtained by way of the four processes explained in connection with FIGS. 6–9. The Y-axis indicates the resistivity in microhms per meter square. The X-axis indicates the ratio of graphite to resin utilized. The four different graphs illustrated in the figure are distinguished from one another by the symbols shown in the legend. For example, the graph designated by the symbol "X" is in connection with the embodiment of the process explained in connection with FIG. 7. For this process, the resulting graphite material has a resisitivity of approximately 10 microhms per meter square for a combination of 90% graphite and 10% phenolic resin.

The graph designated by the symbol "■" is in connection with the embodiment of the process explained in connection with FIG. 8. The resulting graphite material obtained by way of this process has a resistivity of approximately 16 microns per meter square, for a ratio of 90% graphite and 10% phenolic resin. Note that for combinations in the ranges of approximately 90%/10%–75%/25% and 65%/35%–40%/60% of graphite-to-phenolic resin, the graphite material obtained by way of the process represented by graph X has the lowest resistivity, compared with the resistivities of the other graphite materials, obtained by way of the other three processes.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method of making a graphite material, the method comprising:
   a) grinding flexible graphite into a powder having a particle size in a range of approximately 25 to 80 mesh;
   b) soaking the graphite powder in a cryogenic liquid;
   c) expanding the soaked graphite powder;
   d) mixing the graphite powder in an amount ranging between approximately 10%–90% by weight, with a resin, in an amount ranging between approximately 10%–90% by weight; and
   e) hot pressing said graphite powder mixed with said resin.

2. The method of claim 1 wherein before hot pressing, said graphite powder mixed with said resin is introduced into a first mold.

3. The method of claim 2, said hot pressing is performed a pressure that is less than 1 pound per square inch (psi) and at a temperature of approximately 230° Fahrenheit.

4. The method of claim 3 wherein said hot pressing further including,
   removing from said first mold said expanded soaked graphite powder mixed with the resin,
   introducing said expanded soaked graphite powder mixed with the resin into a second mold, and
   hot-pressing said expanded soaked graphite powder mixed with the resin at approximately 2000 pounds per square inch (psi) approximately 350° Fahrenheit for approximately 30 minutes.

5. The method of claim 1 wherein said graphite material has a density of approximately 1.5 grams/centimeter cube (g/cc).

6. The method of claim 1 wherein said resin includes phenolic resin.

7. The method of claim 1 wherein said flexible graphite includes recycled graphite foil.

8. The method of claim 3 wherein hot-pressing the graphite powder mixed with the resin at a pressure that is less than 1 pound per square inch (psi) and at a temperature of approximately 230° Fahrenheit is performed for approximately 30 minutes.

9. The method of claim 1, wherein expanding the soaked graphite powder is performed by heating the expanded graphite powder to a temperature of approximately 650° Fahrenheit (F).

10. A method of making a graphite material, the method comprising:
    a) grinding flexible graphite into a powder having a particle size in a range of approximately 25 to 80 mesh;
    b) soaking the graphite powder in a cryogenic liquid;

c) expanding the soaked graphite powder;

d) grinding the expanded soaked graphite powder into a powder having a particle size in a range of approximately 48 to 100 mesh;

e) mixing the graphite powder in an amount ranging between approximately 10%–90% by weight, with a resin, in an amount ranging between approximately 10%–90% by weight; and f) hot pressing said graphite powder mixed with said resin.

11. The method of claim 10 wherein before hot pressing, said graphite powder mixed with said resin is introduced into a first mold.

12. The method of claim 11, said hot pressing is performed at a pressure that is less than 1 pound per square inch (psi) and at a temperature of approximately 230° Fahrenheit.

13. The method of claim 12 wherein said hot pressing further including, removing from said first mold said graphite powder mixed with the resin, introducing said graphite powder mixed with the resin into a second mold; and hot-pressing said graphite powder mixed with the resin at approximately 2000 pound per square inch (psi) and approximately 350° Fahrenheit for approximately 30 minutes.

14. The method of claim 10 wherein said graphite material has a density of approximately 1.5 grams/centimeter cube (g/cc).

15. The method of claim 10 wherein said resin includes phenolic resin.

16. The method of claim 10 wherein said flexible graphite includes recycled graphite foil.

17. The method of claim 12 wherein hot-pressing the graphite powder mixed with the resin at a pressure that is less than 1 pound per square inch (psi) and at a temperature of approximately 230° Fahrenheit is performed for approximately 30 minutes.

18. The method of claim 10, wherein expanding the soaked graphite powder is performed by heating the expanded graphite powder to a temperature of approximately 650° Fahrenheit (F).

* * * * *

UNITED STATES PATENT AND TRADEMARK OFFICE
CERTIFICATE OF CORRECTION

PATENT NO.    : 6,217,800 B1
DATED         : April 17, 2001
INVENTOR(S)   : Hayward It is certified that error appears in the above-identified patent and that said Letters Patent is hereby corrected as shown below:

<u>Title page,</u>
Item [56], References Cited, delete "5,882,510" and insert -- 5,882,570 --.

Signed and Sealed this

Seventh Day of May, 2002

*Attest:*

JAMES E. ROGAN
*Director of the United States Patent and Trademark Office*

*Attesting Officer*